(12) United States Patent
Tsurimoto et al.

(10) Patent No.: US 8,546,687 B2
(45) Date of Patent: Oct. 1, 2013

(54) GAS INSULATED ELECTRIC APPARATUS

(75) Inventors: Takao Tsurimoto, Tokyo (JP); Manabu Yoshimura, Tokyo (JP); Hitoshi Sadakuni, Tokyo (JP); Yoshinori Shimizu, Tokyo (JP); Takashi Miyamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 712 days.

(21) Appl. No.: 12/446,528

(22) PCT Filed: Oct. 22, 2007

(86) PCT No.: PCT/JP2007/001149
§ 371 (c)(1),
(2), (4) Date: Apr. 21, 2009

(87) PCT Pub. No.: WO2008/053585
PCT Pub. Date: May 8, 2008

(65) Prior Publication Data
US 2011/0000697 A1 Jan. 6, 2011

(30) Foreign Application Priority Data
Oct. 31, 2006 (JP) .................. 2006-295034

(51) Int. Cl.
*H01B 11/18* (2006.01)
(52) U.S. Cl.
USPC ........................................... 174/28
(58) Field of Classification Search
USPC ........................................... 174/28
See application file for complete search history.

(56) References Cited

U.S. PATENT DOCUMENTS

| 3,515,939 | A | * | 6/1970 | Trump ..................... 361/233 |
| 3,814,879 | A | | 6/1974 | Cookson et al. |
| 3,895,176 | A | | 7/1975 | Cookson et al. |
| 3,898,408 | A | | 8/1975 | Cookson et al. |

(Continued)

FOREIGN PATENT DOCUMENTS

| JP | 51 44750 | 11/1976 |
| JP | 55 40651 | 3/1980 |

(Continued)

OTHER PUBLICATIONS

Office Action issued Jul. 12, 2011 in Japanese Patent Application No. 2008-541988 (with English translation) previously filed on Aug. 3, 2011.

(Continued)

*Primary Examiner* — Chau Nguyen
(74) *Attorney, Agent, or Firm* — Oblon, Spivak, McClelland, Maier & Neustadt, L.L.P.

(57) ABSTRACT

A foreign matters trap in which a metallic corrugated plate is arranged in a ground tank so that a line connecting portions of the corrugated plate having the same height is made parallel to a central axis of the ground tank, a metallic round rod is mounted to an corrugated end of the corrugated plate, the corrugated plate and the metallic round rod are connected electrically to each other, and a surface of the corrugated plate is covered by an insulating material. The foreign matters trap is capable of surely trapping metallic foreign matters in a gas insulated electric apparatus and suppressing concentration of an electric field to become excellent in voltage endurance and which can be readily mounted in a ground tank.

13 Claims, 23 Drawing Sheets

(56) References Cited

U.S. PATENT DOCUMENTS

| | | | | |
|---|---|---|---|---|
| 4,092,485 | A | * | 5/1978 | Wanser .................... 174/28 |
| 4,343,964 | A | * | 8/1982 | Wootton .................... 174/10 |
| 4,375,149 | A | | 3/1983 | Hartmannsgruber |
| 4,400,578 | A | * | 8/1983 | Cookson et al. ............ 174/14 R |
| 4,705,914 | A | * | 11/1987 | Bondon .................... 174/28 |

FOREIGN PATENT DOCUMENTS

| | | |
|---|---|---|
| JP | 56 73124 | 6/1981 |
| JP | 56-73124 | 6/1981 |
| JP | 56 121313 | 9/1981 |
| JP | 56 145313 | 11/1981 |
| JP | 56-145313 U | 11/1981 |
| JP | 62-57511 | 4/1987 |
| JP | 62 57511 | 4/1987 |
| JP | 3 45111 | 2/1991 |
| JP | 3045111(A) | 2/1991 |
| JP | 8 47148 | 2/1996 |
| JP | 9 182262 | 7/1997 |

OTHER PUBLICATIONS

Office Action in Chinese Patent Application No. 200780040418.3, dated Apr. 25, 2011, with English translation.
Japanese Office Action issued on Jul. 12, 2011 in corresponding Japanese Application No. 2008-541988 (with an English Translation).
Extended European Search Report issued on Feb. 6, 2013, in European patent Application No. 07827928.8.

* cited by examiner

[FIG.1]
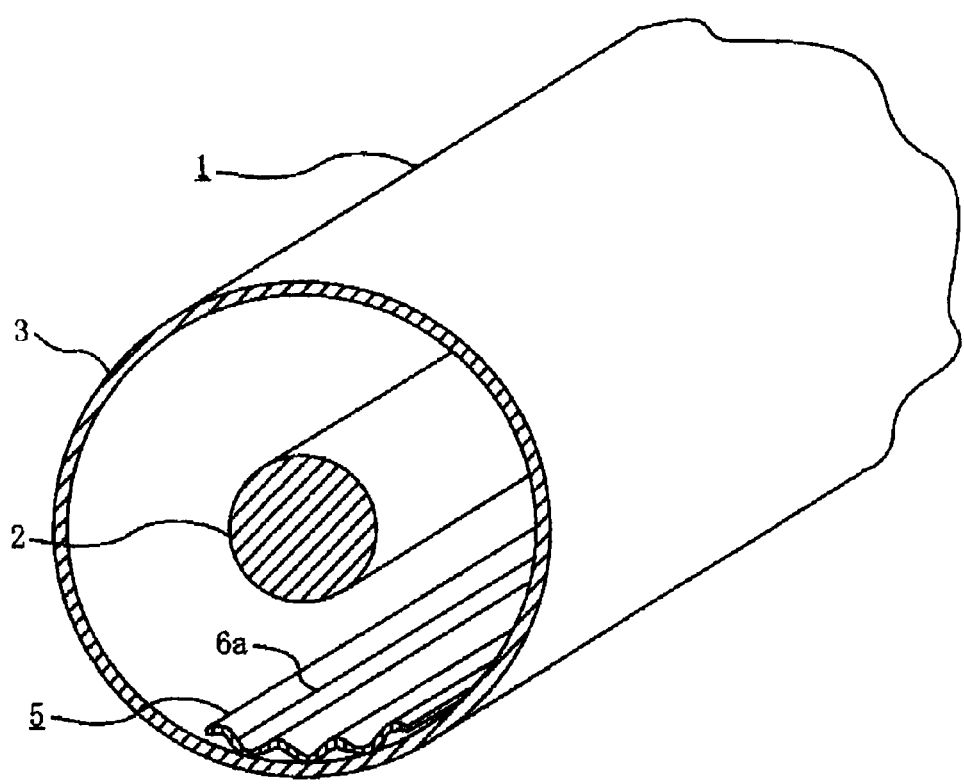

[FIG.2]
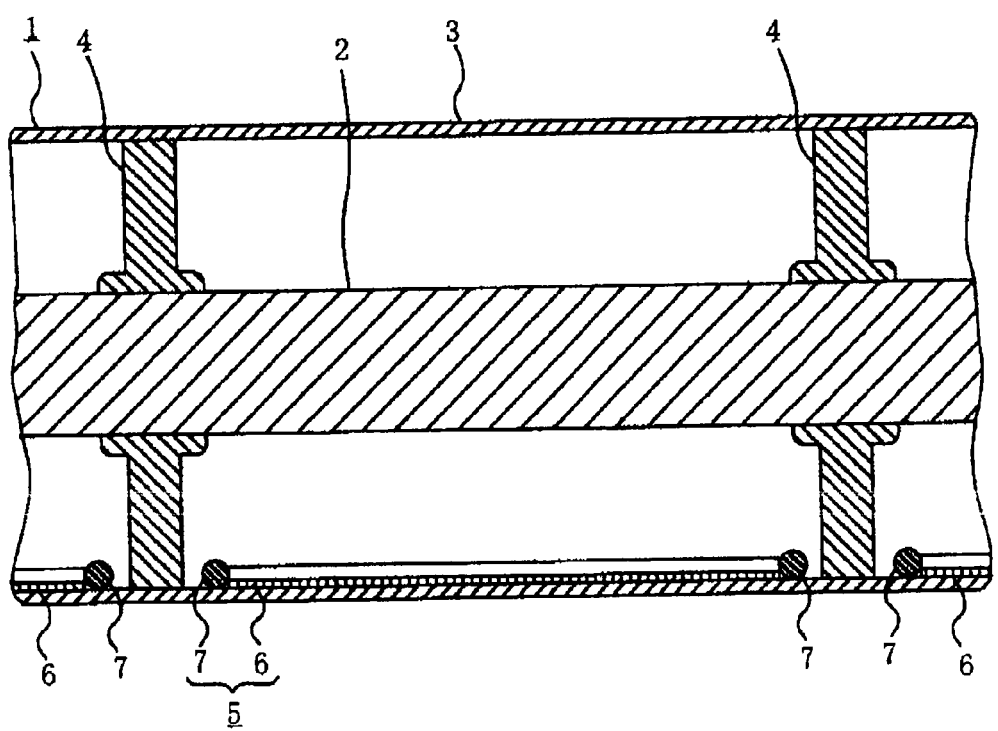

[FIG.3]
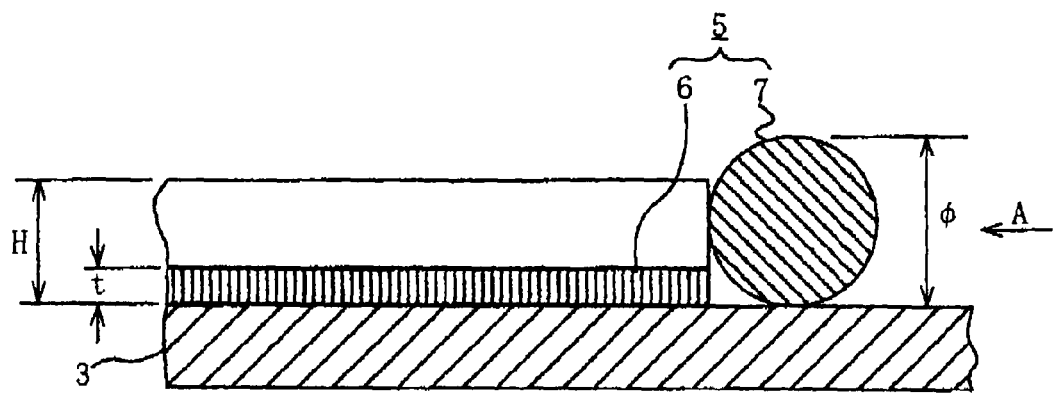

[FIG.4]
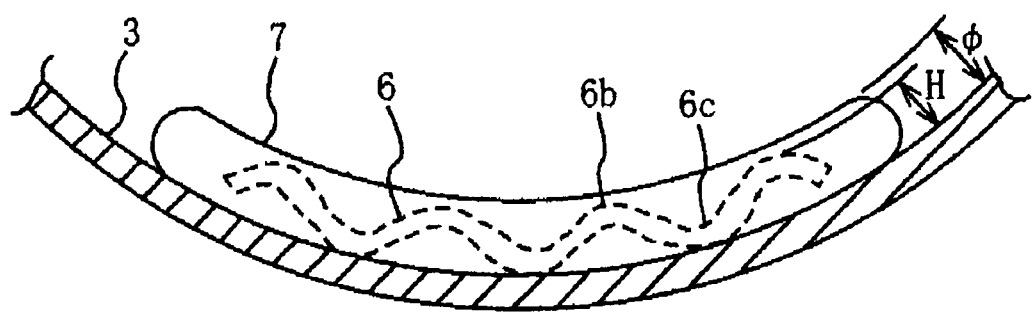

[FIG.5]
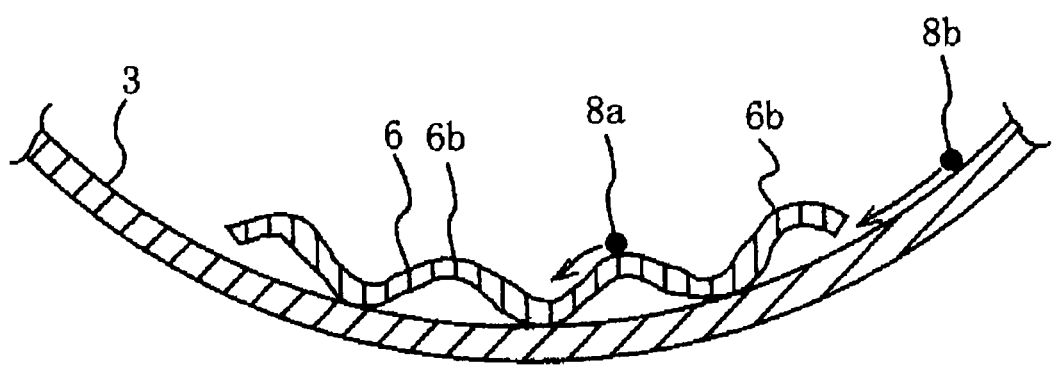

[FIG.6]
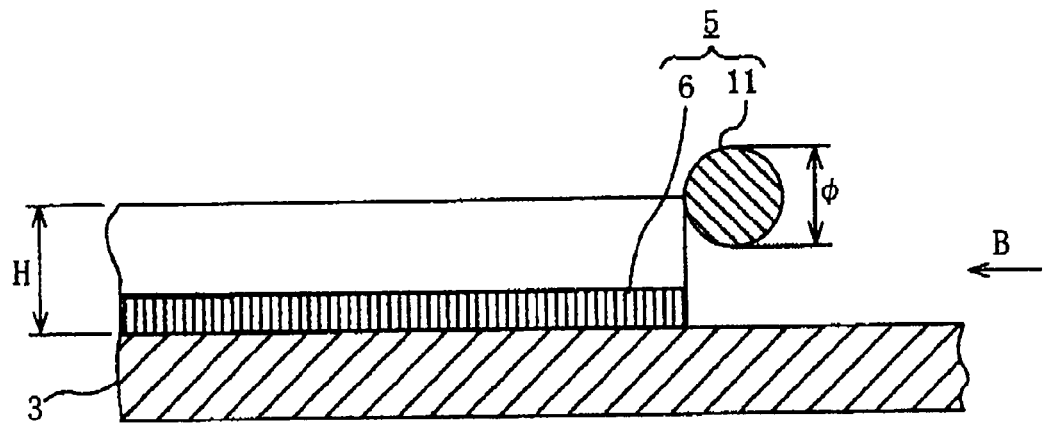

[FIG.7]
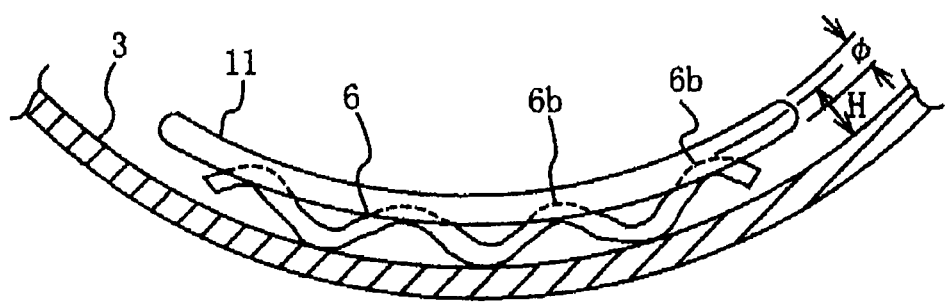

[FIG.8]
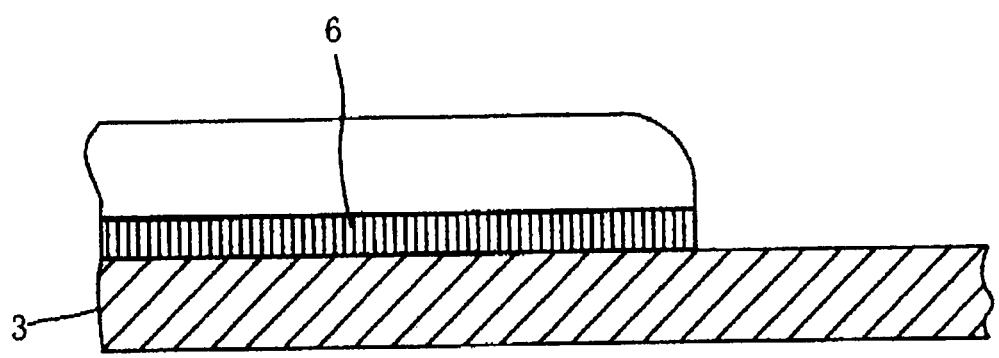

[FIG.9]
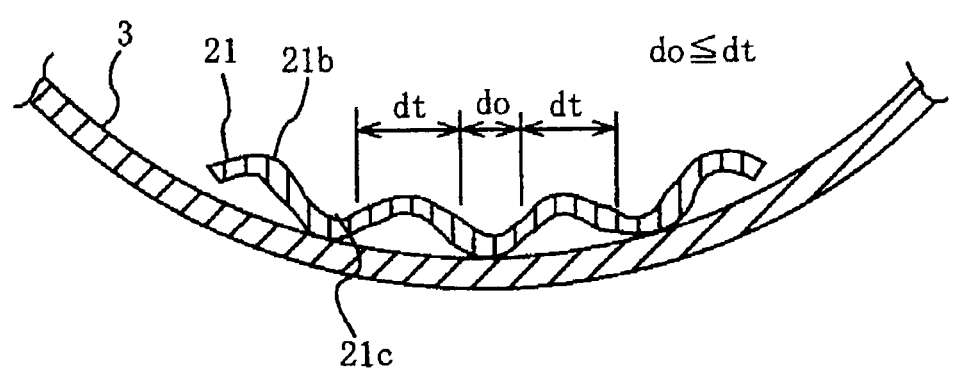

[FIG.10]
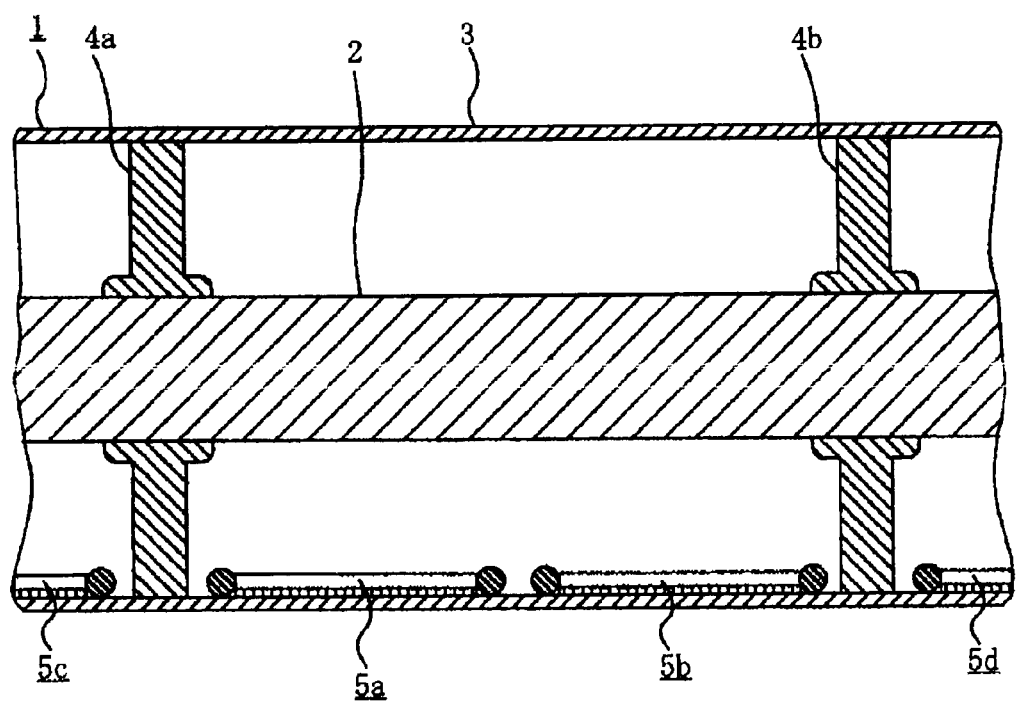

[FIG.11]
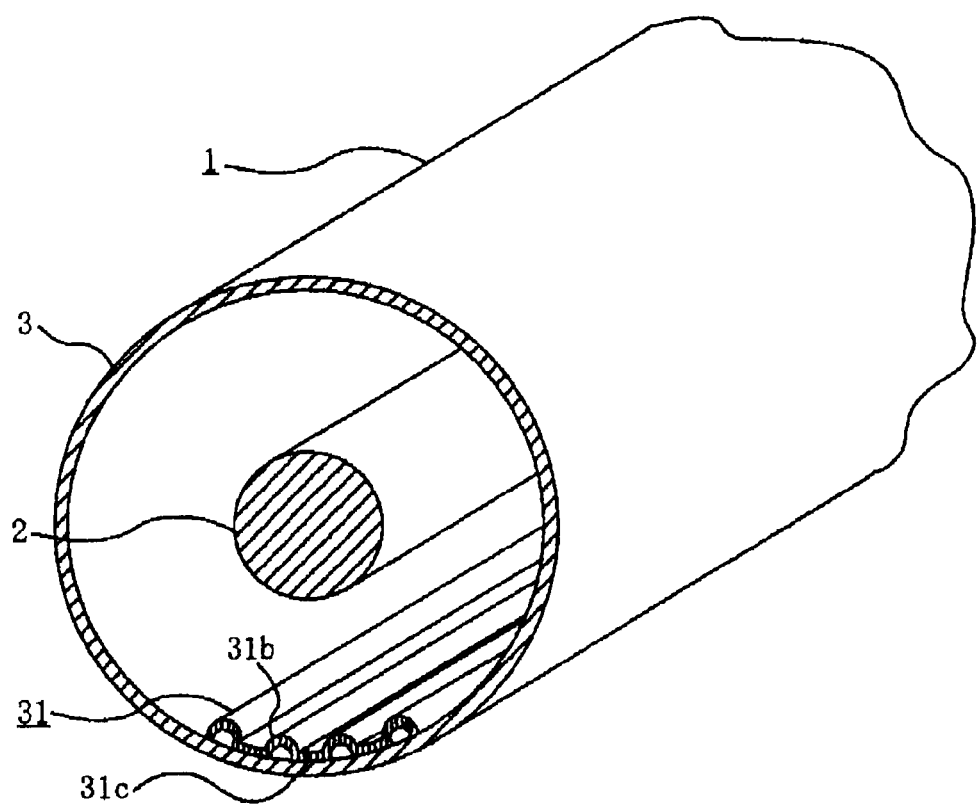

[FIG.12]
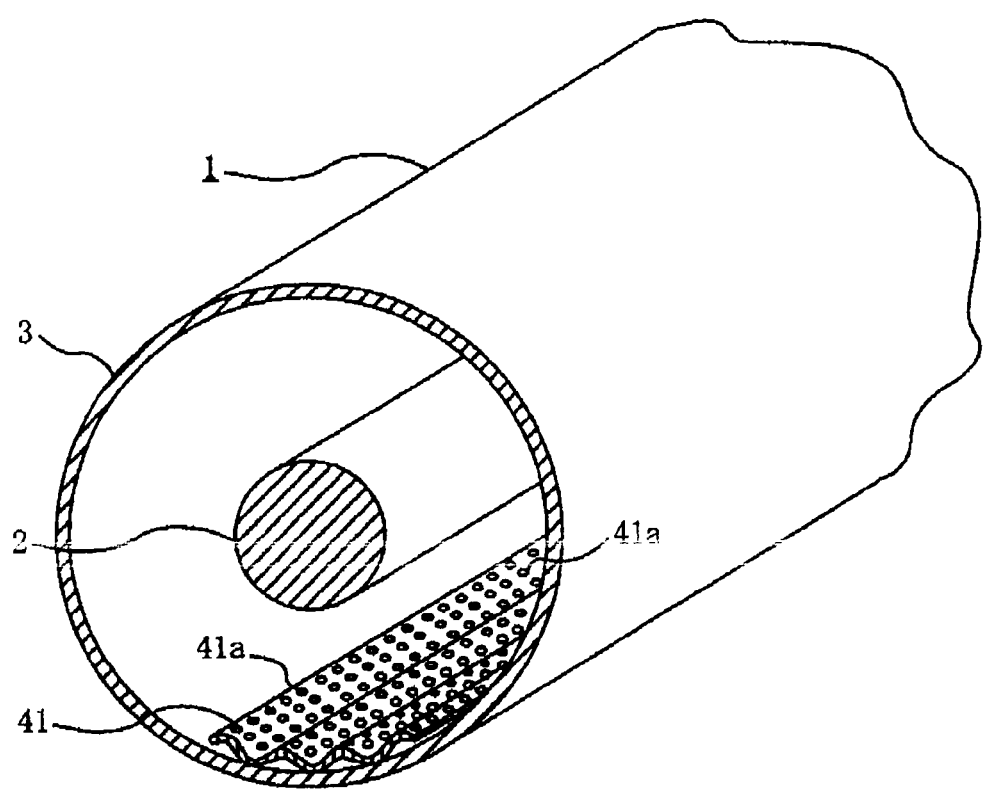

[FIG.13]
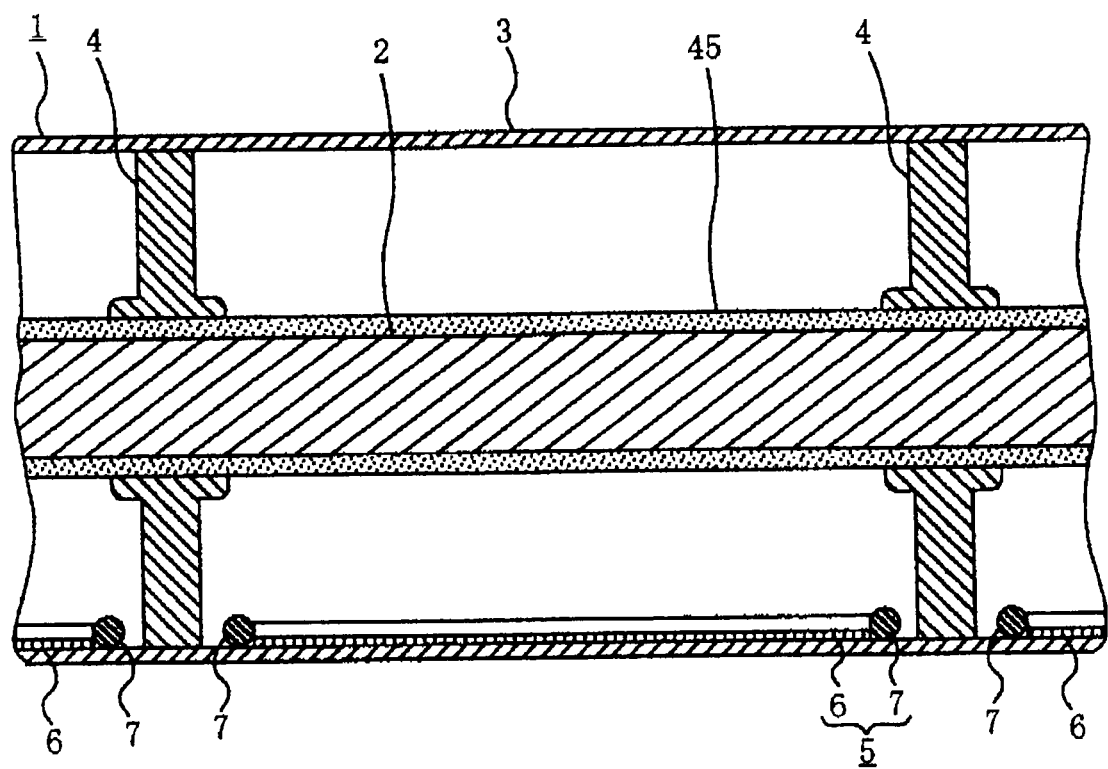

[FIG.14]
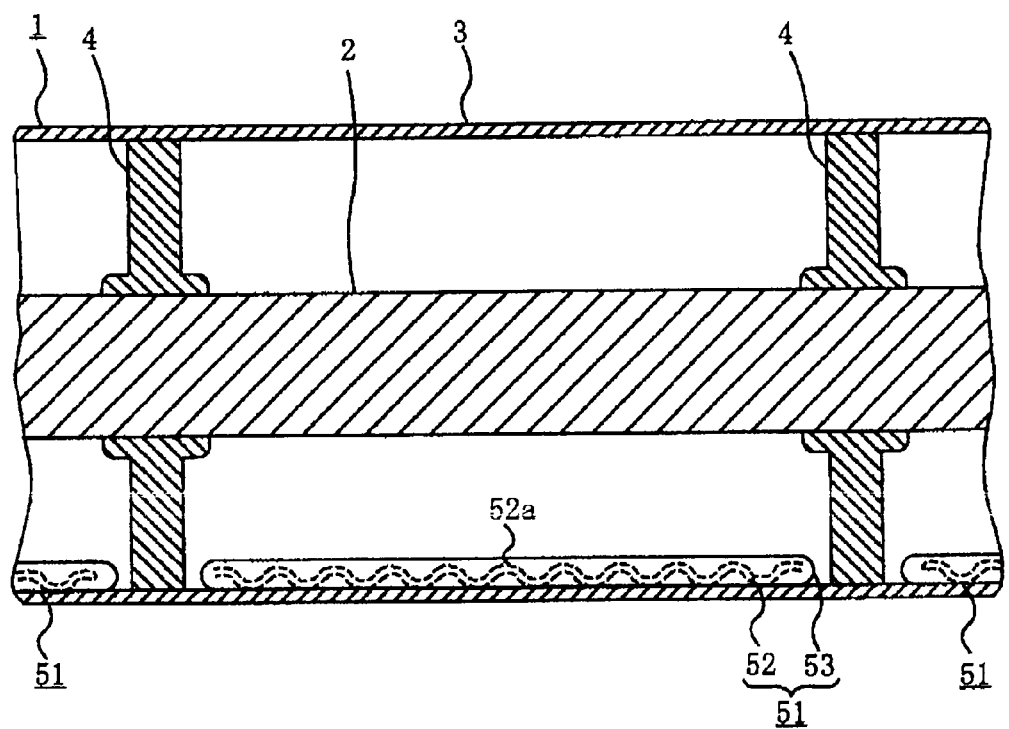

[FIG.15]
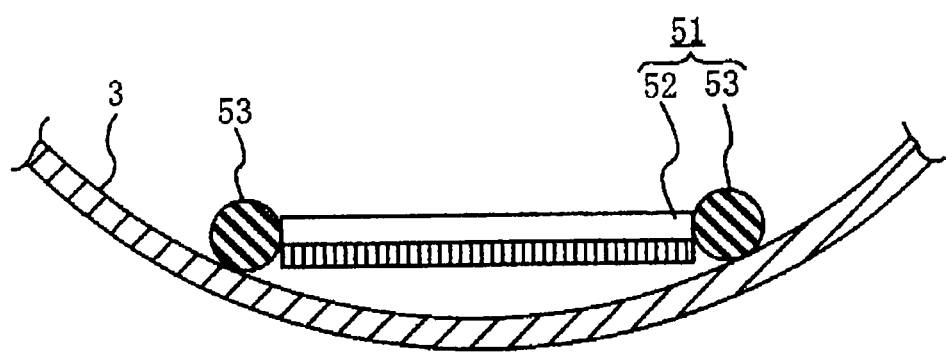

[FIG. 16]
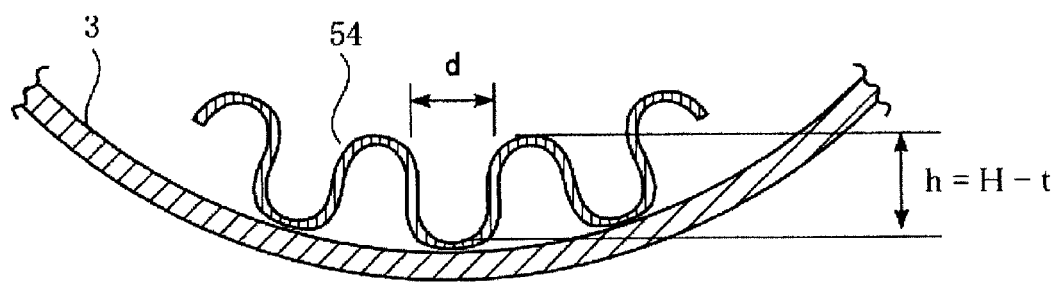

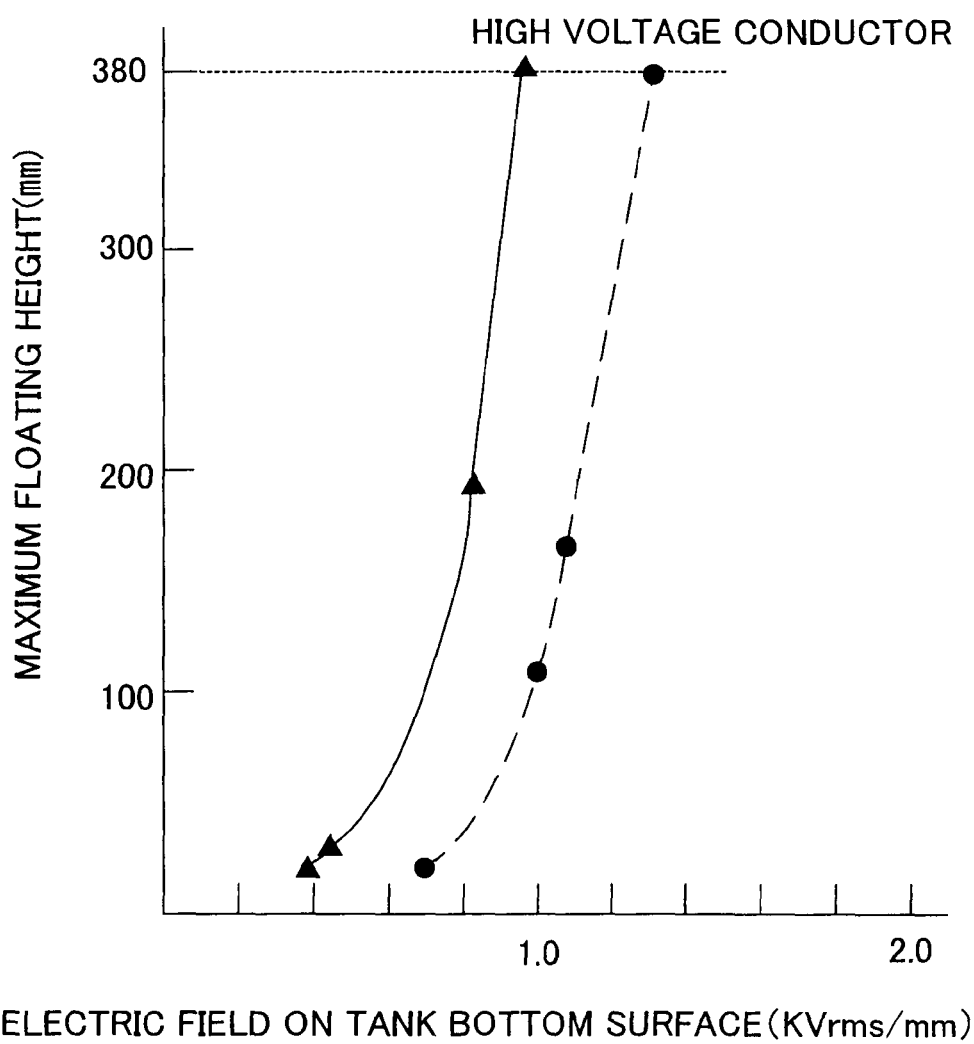

[FIG.18]
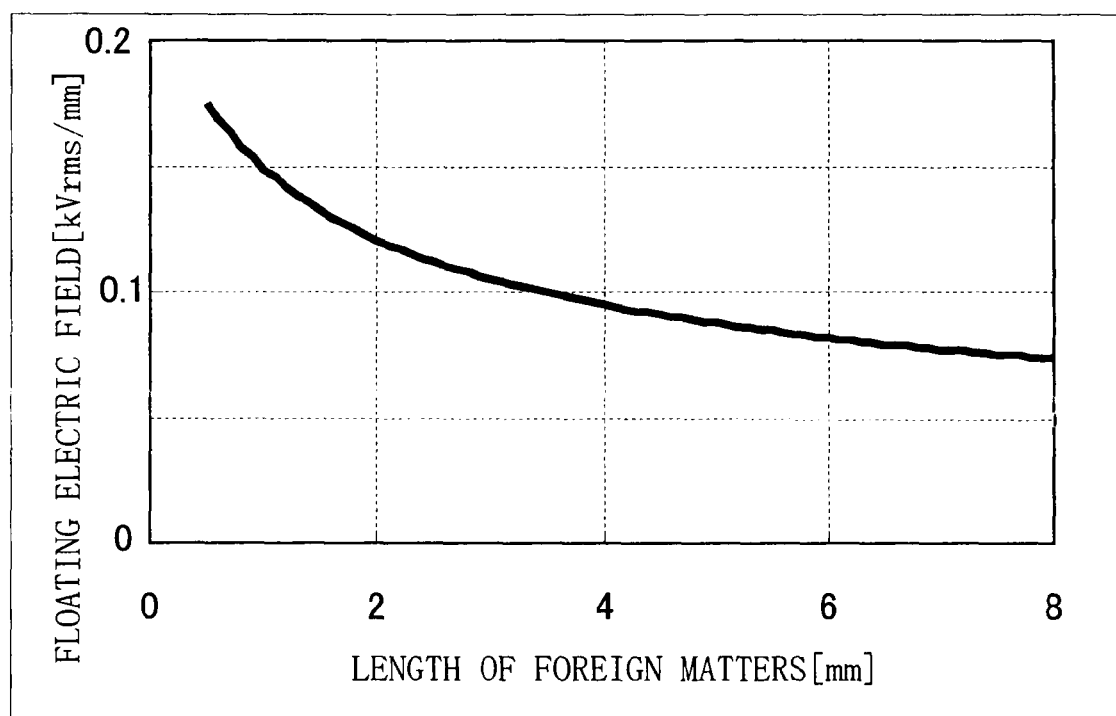

[FIG.19]
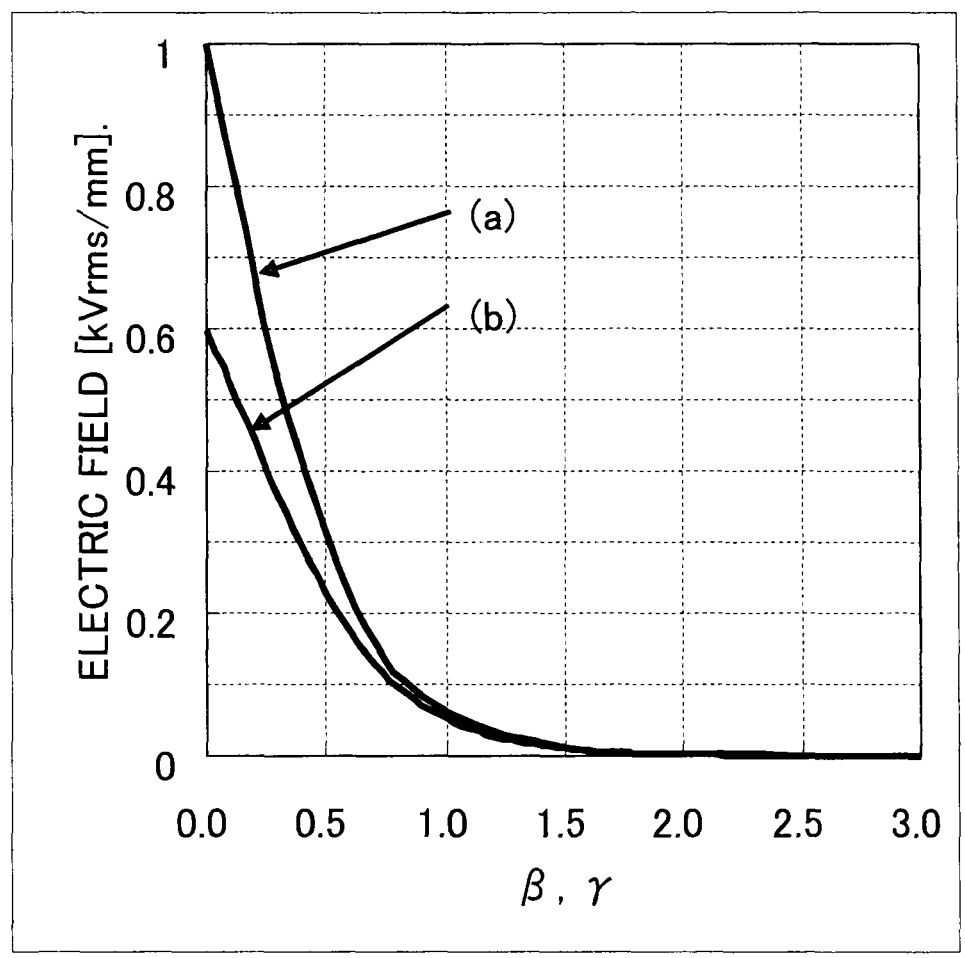

[FIG. 20]
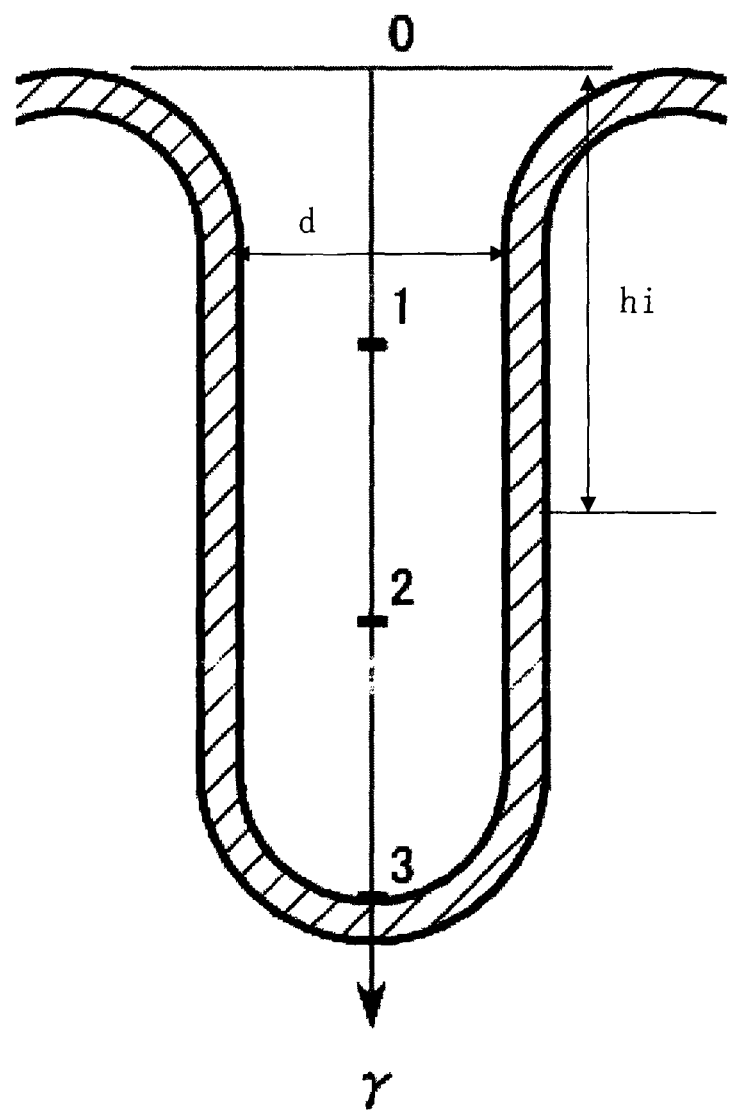

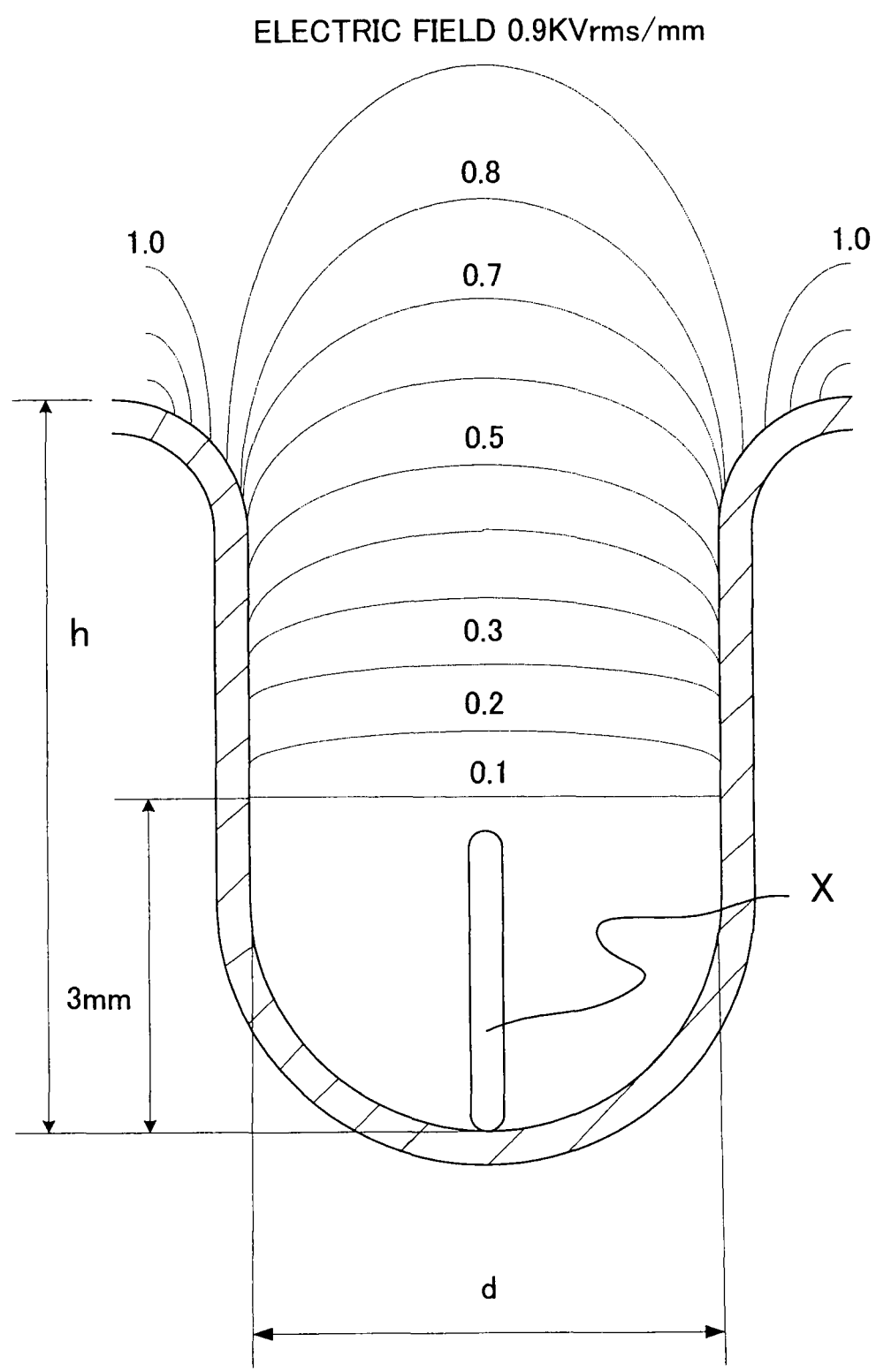
[FIG.21]

[FIG. 22]
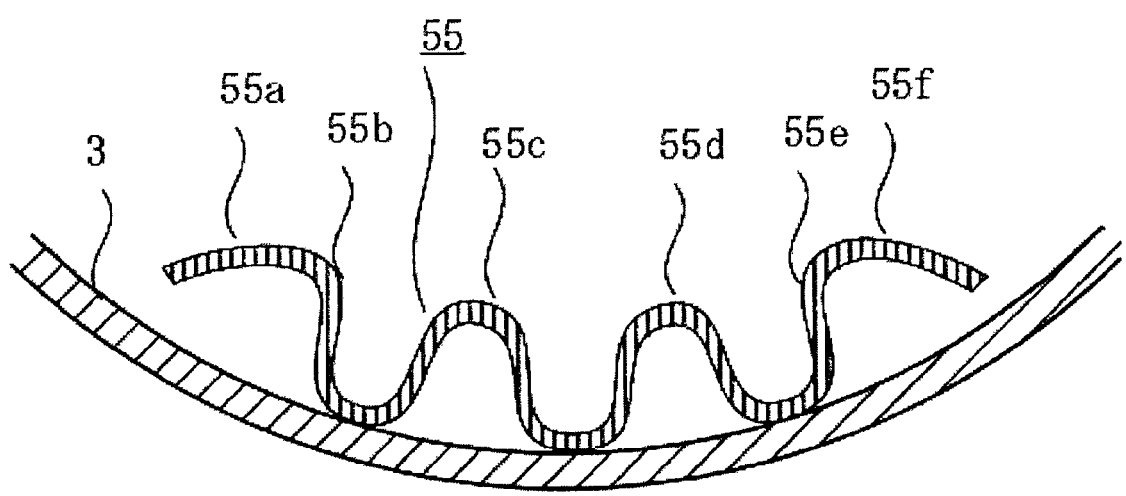

[FIG.23]
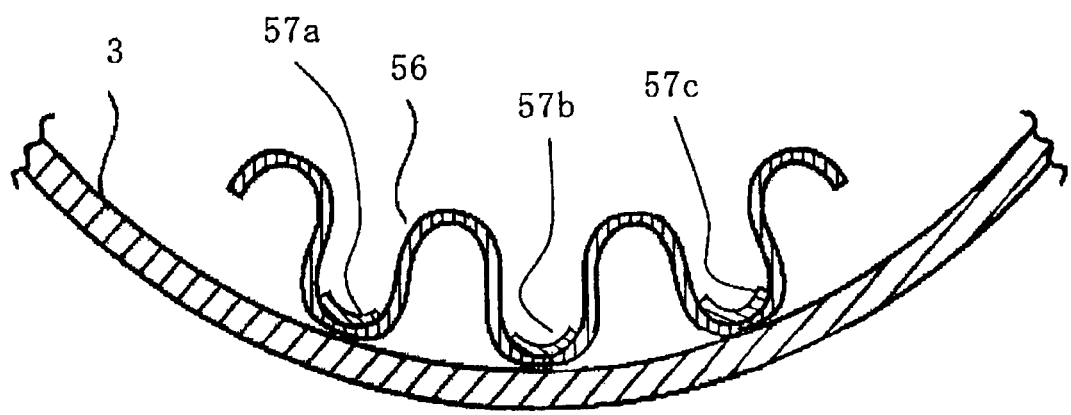

GAS INSULATED ELECTRIC APPARATUS

TECHNICAL FIELD

The present invention relates to a gas insulated electric apparatus, in which a high voltage conductor is accommodated in a ground tank and an insulating gas is filled in the ground tank to insulate the high voltage conductor and the ground tank from each other.

BACKGROUND ART

With conventional gas insulated electric apparatuses, a high voltage conductor is accommodated in a metallic ground tank and an insulating gas is filled in the tank to afford insulation. In this case, when the gas insulated electric apparatus is assembled, metallic foreign matters enter the tank in some cases, so that an intense electric field generated in energization of the high voltage conductor causes the metallic foreign matters to float to adhere to or approach the high voltage conductor whereby the apparatus is lowered in voltage endurance in some cases.

Hereupon, with conventional gas insulated electric apparatuses, there is provided a particle trapper, in which one or more metallic rods are arranged in an axial direction of a tank, an insulating coating is applied to surfaces of the metallic rods, and particles are trapped on a low electric field portion of those portions in contact with the tank (see Patent Citation 1).

Also, with further, conventional gas insulated electric apparatuses, a particle trap, by which electrically conductive particles are trapped, is provided on a lower portion of a tank, and a guide plate is bent in a sawtooth configuration and arranged with downward inclination thereof toward the particle trap whereby particles are trapped (see Patent Citation 2).

Further, with further, conventional gas insulated electric apparatuses, a metallic plate, on which a plurality of smooth wavy irregularities are continuously arranged in an alternate manner, is provided on an inner surface of a vessel and an insulating coating is applied to concave portions to trap foreign matters on low electric field portions of the concave portions (see Patent Citation 3).

Patent Citation 1: JP-UM-A-56-145313 (page 3, line 14 to page 4, line 4, FIGS. 5 and 6)
Patent Citation 2: JP-UM-A-56-73124 (page 4, line 16 to page 5, line 12, FIGS. 3 to 5)
Patent Citation 3: JP-UM-A-62-57511 (page 3, lines 11 to 14, page 4, lines 4 to 8, FIG. 1).

DISCLOSURE OF THE INVENTION

Problems that the Invention is to Solve

Since conventional gas insulated electric apparatuses are constructed in the manner described above, the gas insulated electric apparatus shown in Patent Citation 1 involves a problem that when it is tried to trap foreign matters in a predetermined area on a tank bottom surface, there is a need of arranging a plurality of metallic rods to make positional adjustment difficult when being arranged and there is a need for welding for fixation whereby installation is high in cost.

Also, the gas insulated electric apparatus shown in Patent Citation 2 involves a problem that the trap is provided on the lower portion of the tank, which is costly, and an electric field is concentrated on convex portions of and ends of the guide plate bent in a sawtooth configuration to make the guide plate low in voltage endurance.

Further, the gas insulated electric apparatus shown in Patent Citation 3 involves a problem that since any insulating coating is not applied to the convex portions, foreign matters are liable to float toward a high voltage conductor to cause a decrease in voltage endurance when the foreign matters are present on the convex portions where an electric field is intense.

The present invention has been made to solve the above-discussed problems and has its object to provide a gas insulated electric apparatus having a foreign matters trap, which is capable of surely trapping foreign matters in the apparatus and suppressing concentration of an electric field to become excellent in voltage endurance and which can be readily mounted in a ground tank.

Means for Solving the Problems

A gas insulated electric apparatus according to the invention comprises a ground tank filled with insulating gases and a high voltage conductor mounted in the ground tank with insulating spacers therebetween, and a corrugated plate bent in a corrugated manner to make at least a surface of a convex portion thereof a smoothly curved surface is arranged in the ground tank so that a line connecting portions of the corrugated plate having the same height is made parallel to a central axis of the ground tank.

EFFECT OF THE INVENTION

Since the gas insulated electric apparatus according to the invention comprises a ground tank filled with insulating gases and a high voltage conductor mounted in the ground tank with insulating spacers therebetween, and a corrugated plate bent in a corrugated manner to make at least a surface of a convex portion thereof a smoothly curved surface is arranged in the ground tank so that a line connecting portions of the corrugated plate having the same height is made parallel to a central axis of the ground tank, the corrugated plate can be readily bent along an inner surface of the ground tank and the work of fixing the corrugated plate to the ground tank by welding or the like is made minimum, so that mounting can be readily performed.

BRIEF DESCRIPTION OF THE DRAWINGS

FIG. 1 is a perspective view showing a gas insulated electric apparatus according to Embodiment 1 of the invention.

FIG. 2 is a side, cross sectional view showing the gas insulated electric apparatus according to Embodiment 1 of the invention.

FIG. 3 is an enlarged side, cross sectional view showing a bottom of a ground tank 3.

FIG. 4 is a front, cross sectional view as viewed in A direction in FIG. 3.

FIG. 5 is an enlarged front, cross sectional view showing the bottom of the ground tank 3.

FIG. 6 is an enlarged side, cross sectional view showing the bottom of the ground tank 3.

FIG. 7 is a front, cross sectional view as viewed in B direction in FIG. 6.

FIG. 8 is an enlarged side, cross sectional view showing the bottom of the ground tank 3.

FIG. 9 is an enlarged, front, cross sectional view showing a gas insulated electric apparatus according to Embodiment 2 of the invention.

FIG. 10 is a side, cross sectional view showing a gas insulated electric apparatus according to Embodiment 3 of the invention.

FIG. 11 is a perspective view showing a gas insulated electric apparatus according to Embodiment 4 of the invention.

FIG. 12 is a perspective view showing a gas insulated electric apparatus according to Embodiment 5 of the invention.

FIG. 13 is a side, cross sectional view showing a gas insulated electric apparatus according to Embodiment 6 of the invention.

FIG. 14 is a side, cross sectional view showing a gas insulated electric apparatus according to Embodiment 7 of the invention.

FIG. 15 is a front, cross sectional view showing the gas insulated electric apparatus according to Embodiment 7 of the invention.

FIG. 16 is a front, cross sectional view showing a gas insulated electric apparatus according to Embodiment 8 of the invention.

FIG. 17 is a diagram showing the relationship between an electric field on a tank bottom surface and a maximum floating height.

FIG. 18 is a diagram showing the relationship between a length of foreign matters and a floating electric field.

FIG. 19 is a diagram showing the relationship between a shape coefficient of a corrugated plate and an electric field on bottoms of concave portions of the corrugated plate.

FIG. 20 is a cross sectional view showing the shape of the corrugated plate.

FIG. 21 is a cross sectional view showing the shape of a concave portion of a corrugated plate, an electric field thereof, and a state, in which foreign matters enter.

FIG. 22 is a front, cross sectional view showing a gas insulated electric apparatus according to Embodiment 9 of the invention.

FIG. 23 is a front, cross sectional view showing a gas insulated electric apparatus according to Embodiment 10 of the invention.

BEST MODE FOR CARRYING OUT THE INVENTION

Embodiment 1

An embodiment of the invention will be described below with reference to the drawings. FIG. 1 is a perspective view showing a gas insulated electric apparatus, according to Embodiment 1 of the invention, in a state, in which a ground tank is partially cut in section. FIG. 2 is a side, cross sectional view showing the gas insulated electric apparatus according to Embodiment 1 of the invention.

In the drawings, with the gas insulated electric apparatus 1 according to the invention, an insulating gas is filled in a cylindrical-shaped ground tank 3 and a high voltage conductor 2 is arranged along a central axis of the ground tank 3. The high voltage conductor 2 is supported on the ground tank 3 by an insulating spacer 4 formed from insulating members.

SF6, dry air, nitrogen, carbon dioxide, etc. are used as an insulating gas filled in the ground tank 3 and in order to increase the insulating gas in voltage endurance and to form the whole gas insulated electric apparatus 1 in a compact manner, the insulating gas is generally set higher in pressure than the atmospheric pressure to be charged in the ground tank 3.

A foreign matters trap 5 is mounted on a bottom surface portion of the ground tank 3, the foreign matters trap 5 being fixed to the ground tank 3 by welding to be connected electrically to the ground tank 3. The foreign matters trap 5 comprises corrugated plates 6 formed by subjecting a metallic sheet to a predetermined bending work to make at least surfaces of convex portions smooth surfaces, and metallic round rods 7 mounted to corrugated ends of the corrugated plates 6 and connected electrically to the corrugated plate 6.

Also, the corrugated plate 6 is arranged so that lines (straight lines 6a in FIG. 1) connecting portions having the same height are made parallel to a central axis of the ground tank 3. That is, the corrugated plate 6 is mounted in the ground tank 3 so that corrugated ends of the corrugated plate 6 are positioned along a circumference of the ground tank 3. Insulating coating is applied to surfaces of the corrugated plate 6 and the metallic round rods 7.

FIG. 3 is an enlarged side, cross sectional view showing a bottom of the ground tank 3 shown in FIG. 2 and FIG. 4 is a front, cross sectional view as viewed in A direction in FIG. 3. The corrugated plate 6 is manufactured by bending a metallic sheet, such as aluminum, iron, stainless steel, etc., having a thickness, for example, t=0.5 to 5 mm. After bent, a height H of the corrugated plate 6 is determined by a thickness t of the metallic sheet and approximately H=1 to 20 mm results.

When the corrugated plate 6 is mounted in the ground tank 3, an electric field is concentrated on ends of the metallic sheet to lower the corrugated plate 6 in insulation performance. Since the electric field is concentrated especially on convex portions 6b at the ends of the corrugated plate 6, there is a need of moderating the electric field on the convex portions 6b and therefore the metallic round rods 7 are mounted to corrugated ends of the corrugated plate 6.

Here, since the relationship between a diameter $\phi$ of the metallic round rods 7 and the height H of the corrugated plate 6 is $\phi \geq H$, upper surfaces of the metallic round rods 7 are positioned to be the same in height as, or higher than the convex portions 6b, so that the electric field on the convex portions 6b is moderated effectively.

In the case where the metallic round rods 7 are increased in diameter $\phi$, upper surfaces of the metallic round rods 7 are close to the high voltage conductor 2, in which case $\phi \geq 2H$ can be established unless there is a fear that the electric field on the upper surfaces of the metallic round rods 7 becomes too high, so that such construction affords adequately moderating concentration of the electric field on the convex portions 6b.

Subsequently, an explanation will be given to an effect of trapping foreign matters. When an electric voltage is applied to the high voltage conductor 2, an electric field on the inner surface of the ground tank 3 is increased. When metallic, foreign matters are entrained in the ground tank 3 at this time, the metallic, foreign matters are electrified by the action of the electric field and acted by an electrostatic force in a direction, in which it floats from the inner surface of the ground tank 3.

When the electrostatic force exceeds the weight of the metallic, foreign matters, the metallic, foreign matters float and begin to move toward the high voltage conductor 2. Generally, since an electric field on the high voltage conductor 2 is higher than that on the bottom surface of the ground tank 3, the high voltage conductor 2 is lowered in voltage endurance when the metallic, foreign matters approach or contact with the high voltage conductor 2.

Also, when the shape of metallic, foreign matters is linear, it has largest influences on the voltage endurance, and even when there is not generated a sufficiently large electrostatic force to cause such linear metallic, foreign matters to float toward the high voltage conductor 2, but when the linear metallic, foreign matters uprise with, for example, mechanical vibrations as an occasion, the upright state continues due to an electrostatic force in some cases, and at this time, there is generated such a situation that an electric field at tip ends of the metallic, foreign matters increases locally to cause a decrease in voltage endurance.

In contrast, with the foreign matters trap 5 according to the invention, concave portions 6c of the corrugated plate 6 are low in electric field, so that when metallic, foreign matters enter the concave portions 6c, they are not acted by that electrostatic force, which causes floating and uprising. By adjusting the concave portions 6c in width and depth, the electric field on the concave portions 6c can be made one/several to one/ten plus several, or lower than that on the bottom surface of the ground tank 3 in the case where the foreign matters trap 5 is not present.

On the other hand, as shown in FIG. 5, metallic, foreign matters 8a present on the convex portions 6b of the corrugated plate 6, and metallic, foreign matters 8b present on those sides of the ground tank 3, on which the foreign matters trap 5 is not mounted, are acted by an electrostatic force to move upon application of an electric voltage on the high voltage conductor 2 and are moved downward by a gravitational force to finally enter the low electric field portion of the foreign matters trap 5 not to move further.

In order to make such actions effective to the maximum, it suffices to carry out a so-called pre-application, in which an electric voltage applied to the high voltage conductor 2 is gradually increased before the gas insulated electric apparatus 1 is operated. By doing in this manner, metallic, foreign matters are gradually guided to the low electric field portion formed by the foreign matters trap 5 mounted in a lower portion of the ground tank 3. Further, mechanical vibrations are given to enable moving metallic, foreign matters themselves downward by a gravitational force of the metallic, foreign matters.

As described above, metallic, foreign matters float because the metallic, foreign matters are electrified by the action of an electric field to be acted by an electrostatic force, and so it is possible to effectively suppress floating provided that it is possible to inhibit metallic, foreign matters from being electrified.

Hereupon, by coating an insulating material on surfaces of the foreign matters trap 5 or the like to provide for an insulating coating, it is possible to suppress supply of electric charge to metallic, foreign matters to suppress electrification, thus enabling trapping metallic, foreign matters effectively.

With the foreign matters trap 5, which makes use of the corrugated plate 6 according to the invention, the convex portions 6b are increased in electric field, so that by providing an insulating coating on both portions of the irregularities, that is, the whole surface of the foreign matters trap 5, it is possible to suppress floating of metallic, foreign matters present on the convex portions 6b to trap metallic, foreign matters on the concave portions 6c effectively. Further, in the manufacturing process of the foreign matters trap 5, it suffices to perform spray painting on, for example, the whole foreign matters trap 5, thus enabling insulating coating at a low cost.

With the foreign matters trap 5 described above, while an example of mounting the metallic round rods 7 of diameter $\phi$ has been described as a method of moderating concentration of the electric field on the convex portions 6b at the ends of the corrugated plate 6, springs wound to provide for a height $\phi$ may be provided at ends of the corrugated plate 6 and further hollow, metallic round rods having a diameter $\phi$ may be provided to enable suppressing concentration of the electric field on ends of the corrugated plate 6.

Also, as shown in FIGS. 6 and 7, metallic round rods 11 having a diameter $\phi$ with $\phi<H$ are used to enable providing the foreign matters trap 5, which is excellent in voltage endurance and capable of suppressing concentration of the electric field at ends of the corrugated plate 6 in the same manner as that described above, provided that the metallic round rods 11 are arranged in a manner to contact with and connect to only the convex portions 6b at ends of the corrugated plate 6. In addition, FIG. 6 is an enlarged, side, cross sectional view showing the bottom of the ground tank 3 and FIG. 7 is a front, cross sectional view as viewed in B direction in FIG. 6.

That is, it suffices that bodies mounted to the corrugated ends of the corrugated plate 6 be structured to have at least an upper surface portion thereof formed by a smoothly curved surface and to have an upper surface portion thereof projecting above the convex portions 6b at the ends of the corrugated plate 6, and it is apparent that a section thereof is not needed to be round in shape.

Also, when an insulating material is coated along the corrugated ends of the corrugated plate 6, it is possible to suppress concentration of the electric field at the ends of the corrugated plate 6. Further, as shown in FIG. 8, by bending the convex portions 6b at the ends of the corrugated plate 6 toward the bottom surface of the ground tank 3 to form a curved surface, it is possible to suppress concentration of the electric field at the ends of the corrugated plate 6.

Since the corrugated plate 6 of the foreign matters trap 5 and the metallic round rods 7 are connected electrically to the ground tank 3, the corrugated plate 6 and the metallic round rods 7 are put at earth electric potential to enable inhibiting partial discharge from being generated between them and the ground tank 3, thus achieving an improvement in insulation performance, while even in the case where the corrugated plate 6 and the metallic round rods 7 are not connected electrically to the ground tank 3, a state close to the earth electric potential is brought about to cause no problem in practice provided that the foreign matters trap 5 is disposed quite close to the ground tank 3.

In the case where the bottom surface of the ground tank 3 is high in electric field in terms of design and in the case where the high voltage conductor 2 is disposed close to the foreign matters trap 5, however, the foreign matters trap 5 is increased in electric potential and partial discharge is generated in some cases according to a difference in electric potential between it and the ground tank 3, in which case it is necessary to connect the foreign matters trap 5 electrically to the ground tank 3.

With such construction, lines (straight line 6a in FIG. 1) connecting portions having the same height of the corrugated plate 6, in which at least surfaces of the convex portions are bent in a corrugated manner to define smoothly curved surfaces, are made parallel to the central axis of the ground tank 3, that is, the corrugated plate 6 is mounted in the ground tank 3 to have the corrugated ends of the corrugated plate 6 extending along the circumference of the ground tank 3, so that the corrugated plate 6 is liable to bend along the bottom surface configuration of the ground tank 3 and can be readily mounted. Further, since the work of fixing the corrugated plate 6 to the ground tank 3 by welding or the like is made minimum, mounting can be readily performed.

Also, since the metallic round rods 7, metallic pipes, or springs, which have a diameter amounting to at least the thickness of the corrugated plate 6, are mounted to the corrugated ends of the corrugated plate 6, it is possible to moderate concentration of an electric field at the ends of the convex portions of the corrugated plate 6, thus enabling providing the foreign matters trap 5, which is excellent in voltage endurance.

Further, even the metallic round rods 11 having a smaller diameter than the thickness of the corrugated plate 6 may be mounted connecting the convex portions 6*b* positioned at the ends of the corrugated plate 6, or an insulating material may coat the corrugated ends, or the convex portions 6*b* at the ends of the corrugated plate 6 may be bent toward the ground tank 3, which constitution can provide a foreign matters trap, which can moderate concentration of an electric field at the ends of the corrugated plate 6, is excellent in voltage endurance, and can trap foreign matters.

Also, since the whole surface of the foreign matters trap 5 is covered by an insulating material, it is possible to inhibit metallic, foreign matters from being electrified, thus enabling inhibiting metallic, foreign matters from unnecessarily floating on the convex portions of the foreign matters trap 5 to fix foreign matters entering the concave portions to make the same innocuous. Also, since the foreign matters trap 5 is connected electrically to the ground tank 3, it is possible to prevent partial discharge from being generated between the foreign matters trap 5 and the ground tank 3, thus enabling realizing a gas insulated electric apparatus 1, which is excellent in insulation performance.

Embodiment 2

FIG. 9 is an enlarged, front, cross sectional view showing a gas insulated electric apparatus according to Embodiment 2 of the invention. In the embodiment, a corrugated plate 21 is subjected to bending work to establish do≤dt where dt indicates a width of convex portions 21*b* (so-called upwardly convex portions) of the corrugated plate 21 and do indicates a width of concave portions 21*c* (so-called downwardly convex portions).

With such construction, the convex portions 21*b* of the corrugated plate 21 can be inhibited from increasing in electric field and the convex portions 21*c* can be decreased in electric field, so that it is possible to effectively trap metallic, foreign matters.

That is, when the relationship between do and dt is made dt≤do in a reverse manner to that described above, the convex portions 21*b* of the corrugated plate 21 are shaped to be pointed at tip ends thereof as compared with the case of do≤dt, so that an electric field is concentrated on the convex portions 21*b* and so an increase in electric field becomes conspicuous. In contrast, with that construction, in which do≤dt is established, the convex portions 21*b* are shaped to be gentle and concentration of an electric field is moderated.

Embodiment 3

FIG. 10 is a side, cross sectional view showing a gas insulated electric apparatus according to Embodiment 3 of the invention. A plurality of foreign matters traps 5*a*, 5*b* are mounted between insulating spacers 4*a*, 4*b* in a ground tank 3 of the gas insulated electric apparatus 1. In addition, FIG. 10 shows the case where two foreign matters traps 5*a*, 5*b* are provided but three or more foreign matters traps may be provided.

A plurality of foreign matters traps 5 can be mounted and arranged. A this time, it is effective that clearances between the foreign matters trap 5 be set to be equal to or smaller than a height H of a corrugated plate 6 in order to moderate an electric field on the clearances.

With such construction, since an object can be attained by mounting a plurality of foreign matters traps 5, which are sized to be excellent in handling performance, between the insulating spacers 4 even when the ground tank 3 is large in size and a distance between the insulating spacers 4 is large, it is possible to readily mount the gas insulated electric apparatus 1.

Embodiment 4

FIG. 11 is a perspective view showing a gas insulated electric apparatus, according to Embodiment 4 of the invention, in a state, in which a ground tank is partially cut in section. In the figure, convex portions 31*b* of a corrugated plate 31 of a foreign matters trap 5 are formed to have a curved surface and concave portions 31*c* are formed to be planar.

In this manner, it is desired that the convex portions 31*b* be formed to define a smoothly curved surface in order to suppress an increase in electric field, but a low electric field can be ensured even when the concave portions 31*c* are formed to be planar, so that it is possible to obtain the foreign matters trap 5 which can trap foreign matters at the concave portions 31*c*.

Embodiment 5

FIG. 12 is a perspective view showing a gas insulated electric apparatus, according to Embodiment 5 of the invention, in a state, in which a ground tank is partially cut in section. A corrugated plate 41 of a foreign matters trap 5 is provided with a plurality of through-holes 41*a*.

When the through-holes 41*a* comprise a circular hole having a diameter of 0.5 to 5 mm, it is possible to readily perform the boring work, but they are not necessarily limited to a circular shape. Interiors of the through-holes 41*a* are positioned between the corrugated plate 41 and a ground tank 3 to be extremely low in electric field.

Therefore, foreign matters entering into the through-holes 41*a* are not caused by an electrostatic force to float again but surely trapped in the foreign matters trap 5. In addition, the use of a wire mesh in place of the corrugated plate 41 provided with the through-holes 41*a* makes it possible to produce the same effect as that described above.

Embodiment 6

FIG. 13 is a side, cross sectional view showing a gas insulated electric apparatus according to Embodiment 6 of the invention. In the figure, surfaces of a high voltage conductor 2 is covered by an insulating coating 45. Further, a foreign matters trap 5 is mounted on a bottom surface of a ground tank 3.

In some cases, the voltage endurance of the whole gas insulated electric apparatus 1 is determined by foreign matters influenced by an electric field on the high voltage conductor 2 and influenced by an electric field on the ground tank 3. For such gas insulated electric apparatus 1, voltage endurance of the high voltage conductor 2 can be improved by covering the surfaces of the high voltage conductor 2 with the insulating coating 45, floating of foreign matters can be suppressed by mounting the foreign matters trap 5.

With such construction, even when an insulation distance between the high voltage conductor 2 and the ground tank 3 is small, it is possible to suppress floating of foreign matters to maintain and improve the voltage endurance and to make the whole gas insulated electric apparatus 1 small in size.

Embodiment 7

FIG. 14 is a side, cross sectional view showing a gas insulated electric apparatus according to Embodiment 7 of the invention. FIG. 15 is a front, partial, cross sectional view showing the apparatus. A foreign matters trap 51 is mounted on a bottom surface of a ground tank 3 and fixed to the ground tank 3 by welding to be connected electrically thereto.

The foreign matters trap 51 comprises a corrugated plate 52 formed by subjecting a metallic sheet to a predetermined bending work, and metallic round rods 53 mounted to corrugated ends of the corrugated plate 52, having a diameter over a height of the corrugated plate 52, and connected electrically to the corrugated plate 52, and lines connecting portions of the corrugated plate 52 having the same height are arranged to be made perpendicular with respect to the central axis of the ground tank 3. That is, the corrugated plate 52 is mounted in the ground tank 3 so that the corrugated ends of the corrugated plate 52 are disposed along sides of the ground tank 3. Also, the surface of the corrugated plate 52 is covered by an insulating material.

Since the lines connecting the portions of the corrugated plate 52 having the same height are arranged perpendicular to the central axis of the ground tank 3, the foreign matters trap 51 is not disposed along the curved surface of the ground tank 3 but is put in a state, in which a central portion thereof floats, as shown in FIG. 15.

Thereby, the foreign matters trap 51 is close to the high voltage conductor 2 as compared with the case of Embodiment 1 but foreign matters can be trapped by the foreign matters trap 51, so that an operation can be performed even under that environment, in which a high electric field is generated. Therefore, an insulation distance between the ground tank 3 and the high voltage conductor 2 can be made small and the whole gas insulated electric apparatus 1 can be designed to be made compact.

In this case, as compared with the case of, Embodiment 1, manhour required for manufacture is increased but an increase in electric field can be suppressed on convex portions 52a positioned centrally of the corrugated plate 52 by beforehand working the corrugated plate 52 so as to have the same extending along the inner surface of the ground tank 3, thus enabling making the foreign matters trap 51 excellent in voltage endurance.

As described above, the foreign matters trap 51 capable of moderating an electric field by mounting the metallic round rods 53 at the corrugated ends of the corrugated plate 52 is mounted in the ground tank 3 so that the lines connecting the portions of the corrugated plate 52 having the same height are arranged perpendicular to the central axis of the ground tank 3, whereby it is possible to inhibit an electric field from increasing on the foreign matters trap 51, thus enabling providing foreign matters traps 51 being excellent in voltage endurance.

In addition, while being not described in detail, it is possible in the present embodiment to adopt various constructions shown in Embodiment 1, that is, metallic pipes, or springs may be mounted in place of the metallic round rods, or metallic round rods having a smaller diameter than the thickness of the corrugated plate may be mounted in contact with the convex portions.

Also, the corrugated ends may be covered by an insulating material, or the convex portions at the ends may be bent toward the ground tank 3. Further, the whole surface of the foreign matters trap 51 may be covered by an insulating material, or the constructions shown in Embodiment 2 to Embodiment 6 can be adopted for the present embodiment.

Embodiment 8

FIG. 16 is a front, partial, cross sectional view showing a gas insulated electric apparatus according to Embodiment 8 of the invention. It is assumed that h (=H−t) (mm) indicates a depth from a top of a convex portion to a bottom of a concave portion on a corrugated plate 54 of a foreign matters trap and d (mm) indicates a width of concave portions. Also, L (mm) indicates a length of maximum foreign matters being trapped and not shown.

When a shape coefficient α=(h−L)/d is defined as one of indices, which prescribe a shape of concave portions of the corrugated plate 54, the corrugated plate 54 is shaped so that the shape coefficient α of the corrugated plate 54 is made α≥0.8 to 1.0.

An explanation will be given to the reason for setting so that the shape coefficient α of the corrugated plate 54 is made α≥0.8 to 1.0. Ordinarily, a tank bottom surface is designed in electric field so that foreign matters do not float due to an electrostatic force in the operation of the gas insulated electric apparatus, or do not arrive at a high voltage conductor 2 even when floating.

The relationship between an electric field on the tank bottom surface and floating of foreign matters and the relationship between the electric field and arrival at the high voltage conductor 2 become as shown in, for example, FIG. 17. FIG. 17 shows the relationship between an electric field (kVrms/mm) on the tank bottom surface and a maximum floating height (mm), in the case where metallic, foreign matters have a length of 3 mm and a diameter of 0.2 mm, a solid line shows the case where a tank inner wall is formed only from a metal, and broken lines show the case where a phthalic acid resin is coated on the tank inner wall.

In the figure, in the case where the tank inner wall is formed only from a metal, foreign matters have already floated when an electric field on the tank bottom surface is 0.4 kVrms/mm, and arrive at the high voltage conductor 2 when the electric field is 1.0 kVrms/mm. On the other hand, in the case where a phthalic acid resin is coated on the tank inner wall, foreign matters have already floated at 0.7 kVrms/mm and arrive at the high voltage conductor 2 at 1.3 kVrms/mm.

In this manner, in case of assuming aluminum wire foreign matters having a length of 3 mm, an upper limit of electric field in the case where the tank inner wall is formed only from a metal, or in the case where a phthalic acid resin is coated on the tank inner wall is approximately 1 kVrms/mm, and when the upper limit is exceeded, the aluminum wire foreign matters arrive at the high voltage conductor 2 to cause a fear of dielectric breakdown.

Also, in the case where aluminum wire foreign matters having a length over 3 mm are entrained, there is a fear that even when an electric field is below 1 kVrms/mm, foreign matters arrive at the high voltage conductor 2 to cause a dielectric breakdown. When it is assumed that foreign matters being possibly entrained in the tank have a size of 3 mm at maximum, an upper limit of electric field in tank design is approximately 1 kVrms/mm.

On the other hand; an electric field E enabling floating of wire foreign matters on a metallic surface in an upright state can be theoretically calculated by the following formula assuming that a metallic wire is in the form of a half ellipsoid.

$$\text{Floating electric field } E = \{\ln(2L/r) - 1\} [2\rho r^2 g / (3\in_0 L \{\ln(L/r) - 0.5\})]^{0.5} \quad (1)$$

Here, r, L, ρ, respectively, indicate radius, length, and density of foreign matters, g indicates the gravitational acceleration, and $\in_0$ indicates a dielectric constant.

FIG. 18 shows the relationship between a length L of foreign matters and a floating electric field E for aluminum wire foreign matters having a radius r of 0.2 mm on the basis of the formula (1). A theoretical, floating electric field E is about 0.1 kVrms/mm for foreign matters having a length L of 3 mm and about 0.08 kVrms/mm for a length of 6 mm, and the longer foreign matters, lower the floating electric field E.

Therefore, in order to use a trap to surely trap foreign matters, it is required that a corrugated plate be shaped and sized so that foreign matters present in a tank enter a region of at most 0.1 kVrms/mm in case of a maximum length of, for example, 3 mm and a region of at most 0.08 kVrms/mm in case of a maximum length of 6 mm.

Subsequently, an explanation will be given to an electric field distribution on concave portions of the corrugated plate 54. A curve (a) in FIG. 19 is a diagram indicative of results of that relationship between β and an electric field on bottoms of concave portions of the corrugated plate 54, which is found by electric field analysis, when β=h/d is defined as a shape coefficient β of the corrugated plate 54 in the case where a foreign matters trap is mounted on a tank bottom surface where an electric field is 1 kVrms/mm.

Also, a curve (b) in FIG. 19 is a diagram indicative of the relationship between γ=hi/d and an electric field on a depth hi where hi indicates a depth of a concave portion from a top of a convex portion of a corrugated plate in the case where a corrugated plate having a shape coefficient β=3 and shown in FIG. 20 is mounted on, a tank bottom surface where an electric field is 1 kVrms/mm.

As shown in FIG. 19, the curve (a) and the curve (b) substantially overlap each other in a region, in which an electric field is at most 0.1 kVrms/mm, that is, a region of a shape coefficient β≥0.8. That is, it is found in a region, in which an electric field is at most 0.1 kVrms/mm that an electric field in an optional depth hi of a convex portion of a corrugated plate as shown in FIG. 20 is substantially the same as that on a bottom of that convex portion of a corrugated plate, which has a width d and a depth h being hi.

On the basis of a feature of an electric field distribution on a concave portion of a corrugated plate, an explanation will be given to a shape, which a concave portion of a corrugated plate should assume. For example, in the case where foreign matters have a maximum length of 3 mm, it is required as shown in FIG. 18 that an electric field on a bottom surface of a concave portion of a corrugated plate be made at most 0.1 kVrms/mm, and assuming a corrugated plate, in which a concave portion has a depth h1 and a width d and an electric field on a bottom surface of a concave portion is 0.1 kVrms/mm, a shape coefficient β1 is determined to provide for β1=h1/d=0.8 as apparent from FIG. 19.

By the way, since it is required that whole foreign matters enter a region of at most 0.1 kVrms/mm, h≥h1+3 (mm) is practically necessary as a depth h of a corrugated plate in view of a length of 3 mm for foreign matters. That is, since h1≤h−3 is established, α=(h−3)/d 0.8 is represented when h1=0.8 d obtained by changing h1/d=0.8 is substituted into the formula and simplification is made and a shape coefficient α is again defined.

FIG. 21 shows that shape of a concave portion of a corrugated plate, which meets the condition, an electric field thereof, and a state, in which a foreign matter x enter. Likewise, in the case where foreign matters have a maximum length of 6 mm, at most 0.08 kVrms/mm is required to be applied to the whole foreign matters, so that it is required that a shape coefficient β of a trap be made at least 1.0 in order to bring about a state of at most 0.08 kVrms/mm as shown in FIG. 19, and it is necessary to calculate like the case of 3 mm to accomplish a shape coefficient α=(h−6)/d≥1.0.

Thereafter, when either of the depth h and the width d of the concave portion is determined, the other dimension being necessary is automatically determined. In addition, even when a maximum length of foreign matters is other than those described above, a necessary shape coefficient is found in the same way. Practically, since a maximum value of a magnitude of foreign matters entrained in the tank is 3 to 6 mm described here and foreign matters being larger than that described above are removed in the manufacturing process, manufacture is sufficient when the shape coefficient α meets α=(h−L)/d≥0.8 to 1.0.

As described above, by defining the shape coefficient of a concave portion of a corrugated plate according to a magnitude of foreign matters entrained in the tank, it is possible to construct a gas insulated electric apparatus having a foreign matters trap capable of surely trapping foreign matters having an intended magnitude.

Embodiment 9

FIG. 22 is a front, partial, cross sectional view showing a gas insulated electric apparatus according to Embodiment 9 of the invention. A corrugated plate 55 of a foreign matters trap according to the embodiment is shaped such that a plurality of convex portions 55b to 55e and concave portions are arranged alternately and those portions 55a, 55f extending from tops of the convex portions 55b, 55e, which are positioned at both ends of the corrugated plate 55, to ends of the corrugated plate are larger in curvature than convex portions 55b, 55c, 55d, 55e other than the portions.

Thereby, since the portions 55a, 55f extending from tops of the convex portions 55b, 55e, which are positioned at both ends being not adjacent to the convex portions, to ends of the corrugated plate can be inhibited from being increased in electric field, it is possible to construct a gas insulated electric apparatus, which suppresses a dielectric breakdown attributable to the corrugated plate 55 and is high in reliability.

Embodiment 10

FIG. 23 is a front, partial, cross sectional view showing a gas insulated electric apparatus according to Embodiment 10 of the invention. A corrugated plate 56 of a foreign matters trap according to the embodiment is shaped such that a plurality of convex portions and concave portions are arranged alternately and adhesive layers 57a, 57b, 57c are provided on the concave portions.

As described above, by providing the adhesive layers 57a, 57b, 57c on the concave portions, foreign matters entering into the foreign matters trap do not spring mechanically to float again and so can be surely trapped in the foreign matters trap. Also, when an electric voltage is once applied to trap foreign matters in the foreign matters trap after the gas insulated electric apparatus is assembled in a factory, the foreign matters remain surely trapped in the foreign matters trap even during the shipping of the gas insulated electric apparatus, so that the work of gradually increasing an electric voltage after mounting in the actual place in order to move foreign matters into the foreign matters trap is dispensed with and an operating voltage can be at once applied.

Also, even in the case where an adhesive force of the adhesive layers 57a, 57b, 57c is decreased and lost due to secular changes in operation or for some reason, foreign matters are trapped in a low electric field portion and so do not float again to lead to deterioration in insulation performance.

When a foreign matters trap is not provided but an adhesive layer is only provided on a tank inner surface, there is also a fear that in the case where an adhesive force decreases, foreign matters float again to lead to a decrease in insulation performance and an adhesive force generated by an adhesive layer fixes linear foreign matters in an upright state to cause concentration of an electric field at tip ends of the foreign matters, thereby causing a decrease in insulation performance.

In contrast, in the embodiment, when adhesive layers are provided on concave portions of a foreign matters trap, the concave portions of the foreign matters trap are low in electric field to enable suppressing concentration of an electric field and preventing a decrease in insulation performance even when linear foreign matters are fixed in an upright state.

The invention claimed is:

1. A gas insulated electric apparatus, comprising:
    a ground tank filled with an insulating gas;
    a high voltage conductor in the ground tank;
    an insulating spacer between the high voltage conductor and the ground tank;
    a corrugated plate, disposed within the ground tank, having at least a smoothly curved surface of a convex portion thereof arranged so that a line connecting portions of the corrugated plate having the same height is parallel to a central axis of the ground tank; and
    a body contacting a corrugated end of the corrugated plate and electrically connected to the corrugated plate, having a smoothly curved upper surface portion which protrudes beyond the convex portion at the corrugated end of the corrugated plate.

2. The gas insulated electric apparatus according to claim 1, wherein an insulating material is provided along the corrugated end of the corrugated plate.

3. The gas insulated electric apparatus according to claim 1, wherein the convex portion which is at the corrugated end of the corrugated plate bends toward a bottom surface of the ground tank.

4. The gas insulated electric apparatus according to claim 1, wherein the corrugated plate and the ground tank are connected electrically to each other.

5. The gas insulated electric apparatus according to claim 1, wherein a surface of the corrugated plate is covered by an insulating material.

6. The gas insulated electric apparatus according to claim 1, wherein the convex portion of the corrugated plate is larger in width than a concave portion.

7. The gas insulated electric apparatus according to claim 1, wherein the corrugated plate comprises a plurality of through-holes.

8. The gas insulated electric apparatus according to claim 1, wherein a surface of the high voltage conductor is covered by an insulating material.

9. The gas insulated electric apparatus according to claim 1, wherein portions extending from tops of the convex portions positioned at two ends of the corrugated plate toward ends of the corrugated plate are made larger in curvature than portions of the convex portions except the portions.

10. A gas insulated electric apparatus comprising:
    a ground tank filled with an insulating gas;
    a high voltage conductor in the ground tank;
    an insulating spacer between the ground tank and the high voltage conductor;
    a corrugated plate, disposed within the ground tank, having at least a smoothly curved surface of a convex portion thereof arranged so that a line connecting portions of the corrugated plate having the same height is perpendicular to a central axis of the ground tank;
    wherein the corrugated plate is structured so that a is equal to or more than 0.8 where h indicates a depth from a top of the convex portion of the corrugated plate to a bottom of a concave portion, d indicates a width of the concave portion, L indicates a length of metallic, foreign matters, and $\alpha=(h-L)/d$.

11. The gas insulated electric apparatus according to claim 10, wherein the corrugated plate is structured so as to accomplish $(h-3)/d \geq 0.8$.

12. The gas insulated electric apparatus according to claim 10, wherein the corrugated plate is structured so as to accomplish $(h-6)/d \geq 1.0$.

13. A gas insulated electric apparatus, comprising:
    a ground tank filled with an insulating gas;
    a high voltage conductor in the ground tank;
    an insulating spacer between the high voltage conductor and the ground tank; and
    a corrugated plate, disposed within the ground tank, having at least a smoothly curved surface of a convex portion thereof arranged so that a line connecting portions of the corrugated plate having the same height is parallel to a central axis of the ground tank,
    wherein an adhesive layer is provided on a concave portion of the corrugated plate.

* * * * *